United States Patent
Gao et al.

(10) Patent No.: US 8,024,319 B2
(45) Date of Patent: Sep. 20, 2011

(54) FINITE-STATE MODEL FOR PROCESSING WEB QUERIES

(75) Inventors: Jianfeng Gao, Kirkland, WA (US); Qi Yao, Sammamish, WA (US); Ji-Rong Wen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 11/698,011

(22) Filed: Jan. 25, 2007

(65) Prior Publication Data

US 2008/0183673 A1   Jul. 31, 2008

(51) Int. Cl.
    G06F 17/30   (2006.01)
(52) U.S. Cl. .................. 707/711; 707/769
(58) Field of Classification Search ........... 77/1–5; 707/1–10, 705–720, 758–780
    See application file for complete search history.

(56) References Cited

U.S. PATENT DOCUMENTS

| | | | |
|---|---|---|---|
| 5,239,663 A * | 8/1993 | Faudemay et al. ............. | 707/3 |
| 5,615,378 A * | 3/1997 | Nishino et al. ............... | 704/4 |
| 6,233,545 B1 * | 5/2001 | Datig ......................... | 704/2 |
| 6,507,877 B1 * | 1/2003 | Ross .......................... | 710/53 |
| 6,557,004 B1 * | 4/2003 | Ben-Shachar et al. ......... | 707/102 |
| 6,662,184 B1 * | 12/2003 | Friedberg ..................... | 707/754 |
| 7,478,033 B2 * | 1/2009 | Wu et al. ..................... | 704/2 |
| 2002/0129012 A1 * | 9/2002 | Green ......................... | 707/3 |
| 2002/0152258 A1 * | 10/2002 | Zhou .......................... | 709/201 |
| 2004/0006569 A1 * | 1/2004 | Carlin et al. ................. | 707/101 |
| 2004/0267713 A1 * | 12/2004 | Chaudhuri et al. ............. | 707/3 |
| 2005/0080612 A1 | 4/2005 | Chai et al. ................... | 704/5 |
| 2005/0086590 A1 | 4/2005 | Lee et al. .................... | 715/505 |
| 2005/0209844 A1 | 9/2005 | Wu et al. ..................... | 704/2 |
| 2005/0289463 A1 | 12/2005 | Wu et al. ..................... | 715/533 |
| 2006/0048055 A1 | 3/2006 | Wu et al. ..................... | 715/535 |
| 2006/0106769 A1 * | 5/2006 | Gibbs ......................... | 707/3 |
| 2006/0253427 A1 | 11/2006 | Wu et al. ..................... | 707/3 |

OTHER PUBLICATIONS

Chen, Zheng et al., *A New Statistical Approach to Chinese Pinyin Input*, Microsoft Research China. 7 pages (2000).
Lu, Yan, et al., et al., *Mining the Query Logs of Chinese Web Search Engine for Character Usage Analyis*, The University of Hong Kong, School of Business. 7 pages (2006).

* cited by examiner

*Primary Examiner* — Wilson Lee
(74) *Attorney, Agent, or Firm* — Westman, Champlin & Kelly, P.A.

(57) ABSTRACT

A method of creating an index of web queries is discussed. The method includes receiving a first query representative of one or more symbolic characters and assigning the first query to a first data structure. A first text string representative of the first query is created and assigned to a second data structure. The first and second data structures are stored on a tangible computer readable medium.

12 Claims, 11 Drawing Sheets

| Search | English Meaning |
|---|---|
| 中国 | China |
| 中国电信 | China Telecom |
| 中国银行 | Bank of China |
| 中国邮政 | China Post (Office) |
| 中国式离婚 | Chinese Style Divorce |

| Query | Pinyin String |
|---|---|
| 中国 | zhong1guo2 |
| 中国电信 | zhong1guo2dian4xin4 |
| 中国银行 | zhong1guo2yin2hang2 |
| 中国邮政 | zhong1guo2you2zheng4 |
| 中国式离婚 | zhong1guo2shi4li2hun1 |

FIG. 8

| Query | Pinyin Strings including Abbreviations |
|---|---|
| 中国 | zhong1guo2<br>zg |
| 中国电信 | zhong1guo2dian4xin4<br>zgdx |
| 中国银行 | zhong1guo2yin2hang2<br>zgyh |
| 中国邮政 | zhong1guo2you2zheng4<br>zgyz |
| 中国式离婚 | zhong1guo2shi4li2hun1<br>zgslh |

FIG. 9

| Query | Pinyin Strings including Alternate Spellings |
|---|---|
| 中国 | zhong1guo2<br>zong1guo2 |
| 中国电信 | zhong1guo2dian4xin4<br>zong1guo2dian4xin4 |
| 中国银行 | zhong1guo2yin2hang2<br>zong1guo2yin2hang2 |
| 中国邮政 | zhong1guo2you2zheng4<br>zong1guo2you2zheng4<br>zhong1guo2you2zeng4<br>zong1guo2you2zeng4 |
| 中国式离婚 | zhong1guo2shi4li2hun1<br>zong1guo2shi4li2hun1<br>zhong1guo2si4li2hun1<br>zong1guo2si4li2hun1 |

FINITE-STATE MODEL FOR PROCESSING WEB QUERIES

BACKGROUND

Web search programs are used to search for locations on a Wide Area Network such as the Internet for locations or sites that contain particular information provided by a user of the web search program. Typically, a user of the web search program provides an input to the web search program, which the web search program uses to identify potential sites or locations on the wide area network. The input provided by the user can be one or more words and can include, for example, a phrase or phrases.

In languages such as English that have a relatively limited alphabet, inputting words or phrases into a web search program with a keyboard or other similar device is a relatively easy task. However, some languages, such as Chinese, include literally hundreds or even thousands of unique characters or symbols that are used to represent words. In those languages, providing input for a web search program is not nearly as trivial as it is, for example, in English.

Languages such as Chinese, with its thousands of characters are obviously not well adapted to be inputted into a program by a keyboard type device. Some progress has been made however, to make such languages more adaptable to being input into a program. Romanized representations, known as pinyin have been created to represent Chinese symbolic characters. For example, zhong1 guo2 are two pinyins that represent the symbols 中国. These symbols represent the Chinese spelling of the word "China." Thus, by typing zhong1 guo2, the romanized representation of 中国 can be inputted into a computer using a standard keyboard given that the computer has an interface such as Microsoft IME.

Even with the romanized representation of Chinese characters, input into a computer of pinyin representations is a particularly arduous task. In addition, because pinyin strings do not necessarily have a one-to-one representation with Chinese characters, the input of Chinese pinyin strings into a web search program does not provide an optimum method of providing input data for a web query program of the type described above. Thus, there is a need for a web query program that simplifies the input of data to create a string of characters that can be used as an input for a web search engine.

The discussion above is merely provided for general background information and is not intended to be used as an aid in determining the scope of the claimed subject matter.

SUMMARY

In one illustrative embodiment, a method of creating an index of web queries is discussed. The method includes receiving a first query representative of one or more symbolic characters and assigning the first query to a first data structure. The method further includes creating a first text string representative of the first query and assigning it to a second data structure. The first and second data structures are stored on a tangible computer readable medium.

In another illustrative embodiment, a finite-state language model of web queries is discussed. The model is stored on a tangible medium and includes a first binary tree having a plurality of nodes each having a text string stored therein. The model also includes a second binary tree having a plurality of nodes each having a string of at least one non-alphabetic character stored therein. At least one of the nodes of the first binary tree is associated with one of the nodes of the second binary tree.

In yet another embodiment, method of suggesting queries for a web search is discussed. The method includes receiving an input indicative of a textual request for a query. The input is compared against a finite state model including a store of non-alphabetic queries. One or more non-alphabetic queries are selected from the finite state model. The selected non-alphabetic queries are displayed as a ranked list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
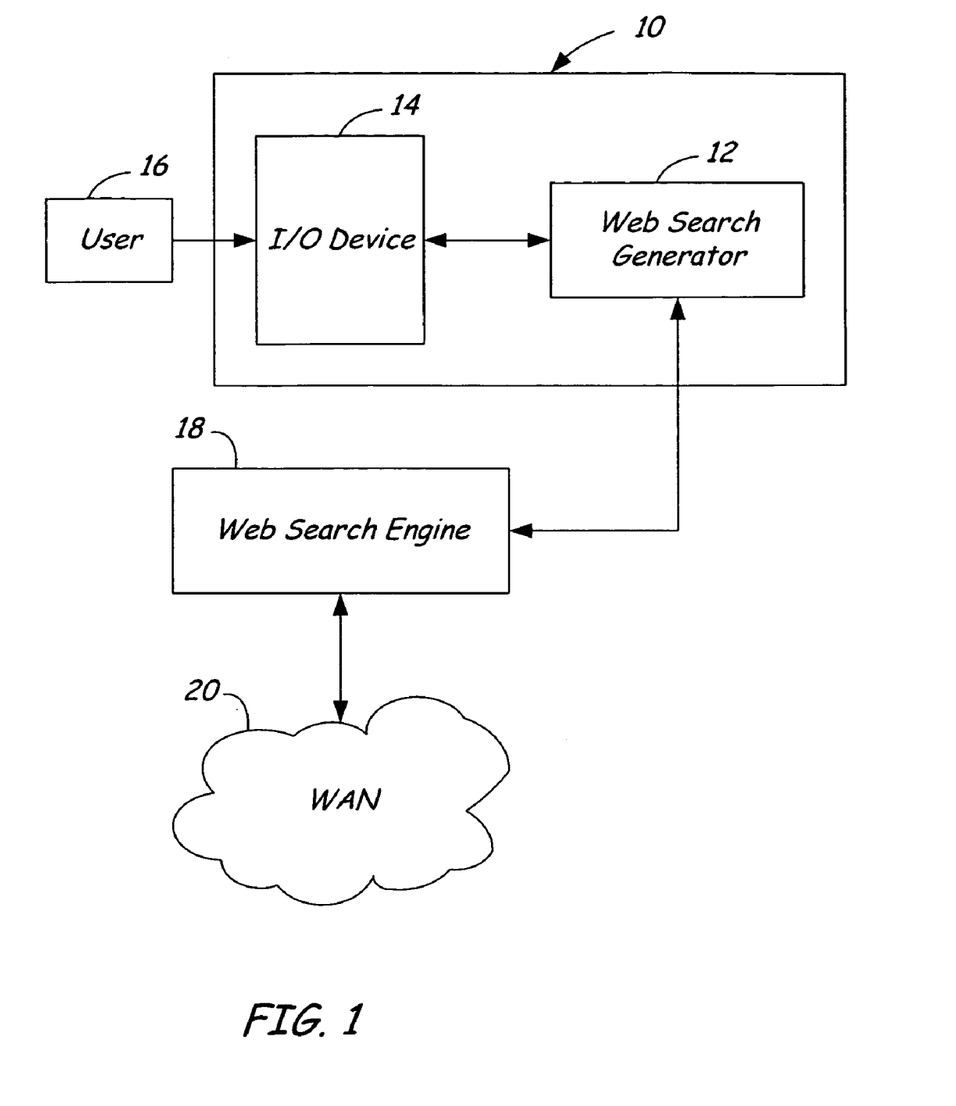
FIG. 1 is a block diagram illustrating a system for searching a Wide Area Network including a web search generator for a character-based written language according to one illustrative embodiment.

The present embodiments discussed herein are directed towards a system and method of developing a web search generator and accessing that generator in response to a user input to create a list of potential web queries. The user, upon receiving the list, can choose a web query to conduct a search of a Wide Area Network (WAN) such as the Internet for information. FIG. 1 illustrates a web query suggestion system 10 according to illustrative embodiment. System 10 includes an input/output device 14, which is capable of being manipulated by a user 16 to provide an alphanumeric input. The input/output device 14 can include, for example, a keyboard, which the user 16 can manipulate to identify a string of information to be sent to a web search generator 12.

Web generator 12 is configured to receive signals from the input/output device 14 indicative of the alphanumeric input provided by the user 16. The web generator 12, in one illustrative embodiment, provides a signal in return to the input/output device 14 that represents a list of one or more potential web queries for the user 16 to consider. The web queries provided by the web generator 14, in one embodiment are provided as characters, such as, for example Chinese characters. The alphanumeric data provided to the web generator 14 are, in one embodiment, one or more pinyin, or Romanized representations of Chinese characters. While the embodiments discussed below reference Chinese characters and pinyins, it is to be understood that the discussion herein is not intended to be limited to Chinese characters, but can be applied to any language that utilizes symbolic, that is, non-alphabetic, characters of the type used in written Chinese.

The input/output device 14 is shown in FIG. 1 as being capable of communicating with a web search engine 18, which in turn is capable of accessing a WAN 20. Communication between the input/output device 14 and the web search engine 18 can be accomplished in any suitable manner. For example, the web search engine 18 may be located remotely and accessed via an Internet service provider (ISP). In addition, the web search generator 12 can also be remotely located and accessed via an ISP. When the user 16 selects a web search, the input/output device 14, illustratively communicates that web search to the web search engine 18, which in turn searches the WAN 20 and illustratively provides the results of the search to the input/output device 14. In one embodiment, the input/output device 14 is a computer, but alternatively, the input/output device 14 can be any of a number of different devices.

Figure 2:
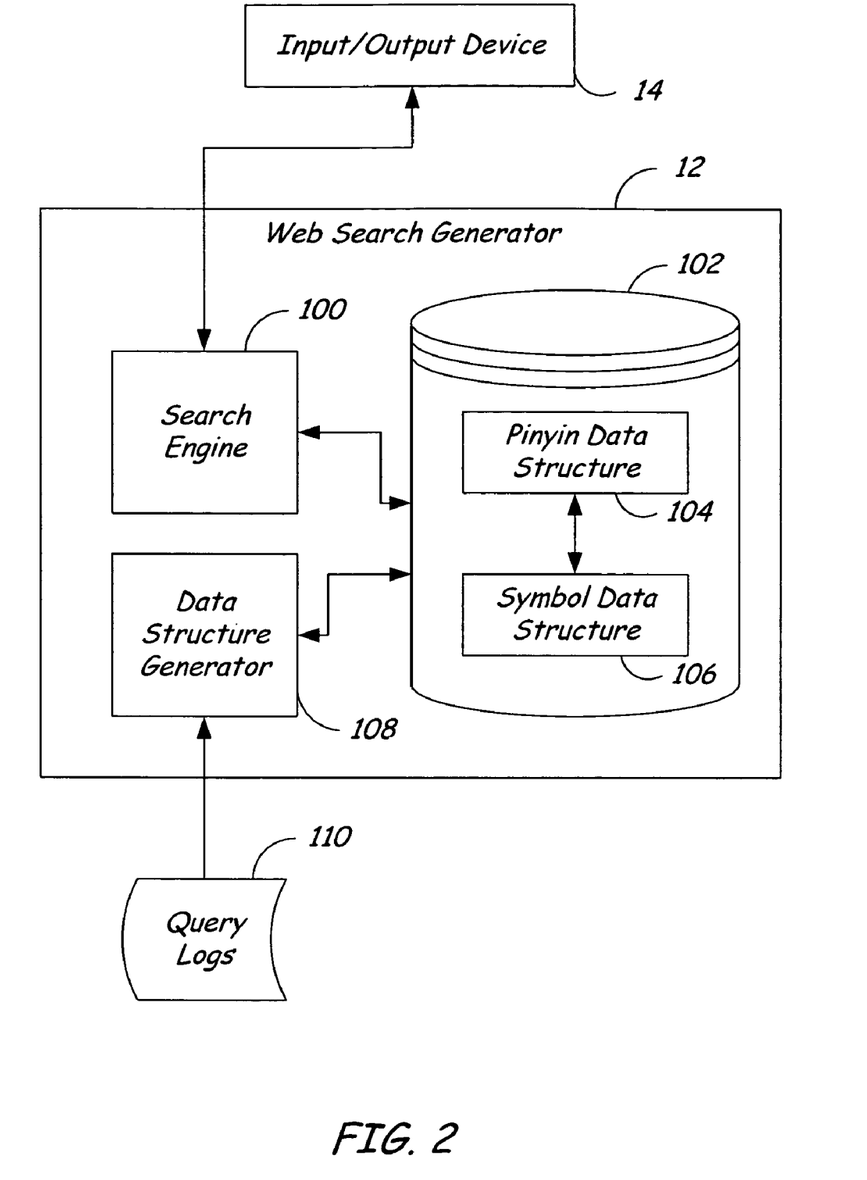
FIG. 2 is a block diagram illustrating the web search generator of FIG. 1 in more detail.

FIG. 2 illustrates the web search generator 12 in more detail. Web search generator 12 includes a search engine 100 that is configured to receive an input from the input/output device 14. The search engine 100 is capable of accessing a data store 102 that, in one embodiment includes a pinyin data structure 104 and a symbol data structure 106. The pinyin data structure 104 and the symbol data structure 106 are illustratively binary trees, which will be discussed in more detail below, although they can be other data structures as well.

The web search generator 12 also illustratively includes a data structure generator 108, which creates the pinyin data structure 104 and the symbol data structure 106. The data structure generator 108, in one embodiment receives data from query logs 110, which include information about previously employed or defined web search queries. The data structure generator 108 receives the information from the query logs 110 and creates the pinyin data structure 104 and the symbol data structure 106, which can then be searched by the search engine 100.

Figure 3:
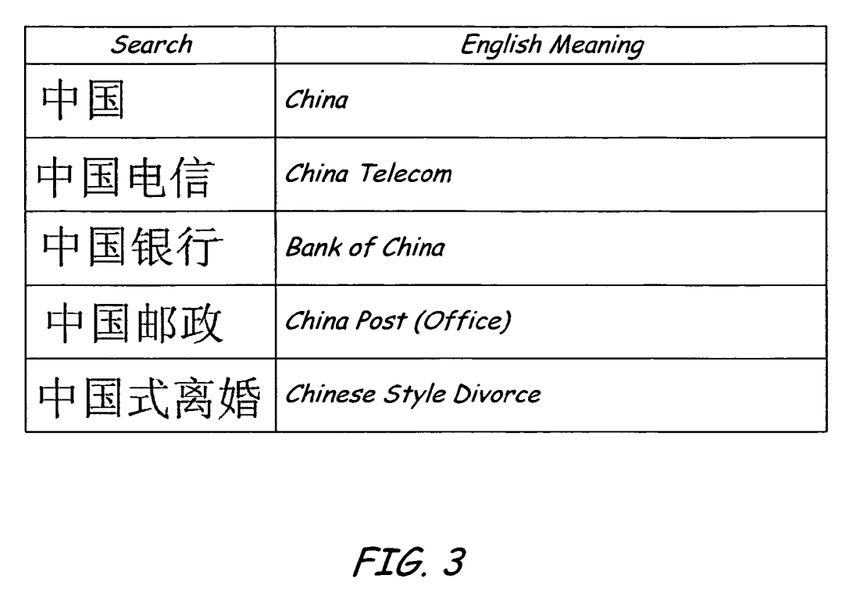
FIG. 3 is a table illustrating a number of web searches in a symbolic language and a corresponding English translation.

FIG. 3 provides a table of queries representative of the type of information provided in query logs 110. The first column lists a number of different web queries and the second column provides an English translation of the web queries for the purposes of this discussion. In this example, each of the queries provided in FIG. 3, 中国 (China), 中国银行 (Bank of China), 中国邮政 (China Post Office), 中国电信 (China Telecom) and 中国式离婚 (Chinese-Style Divorce, a popular TV series) begin with the same two Chinese characters, 中国.

Figure 4:
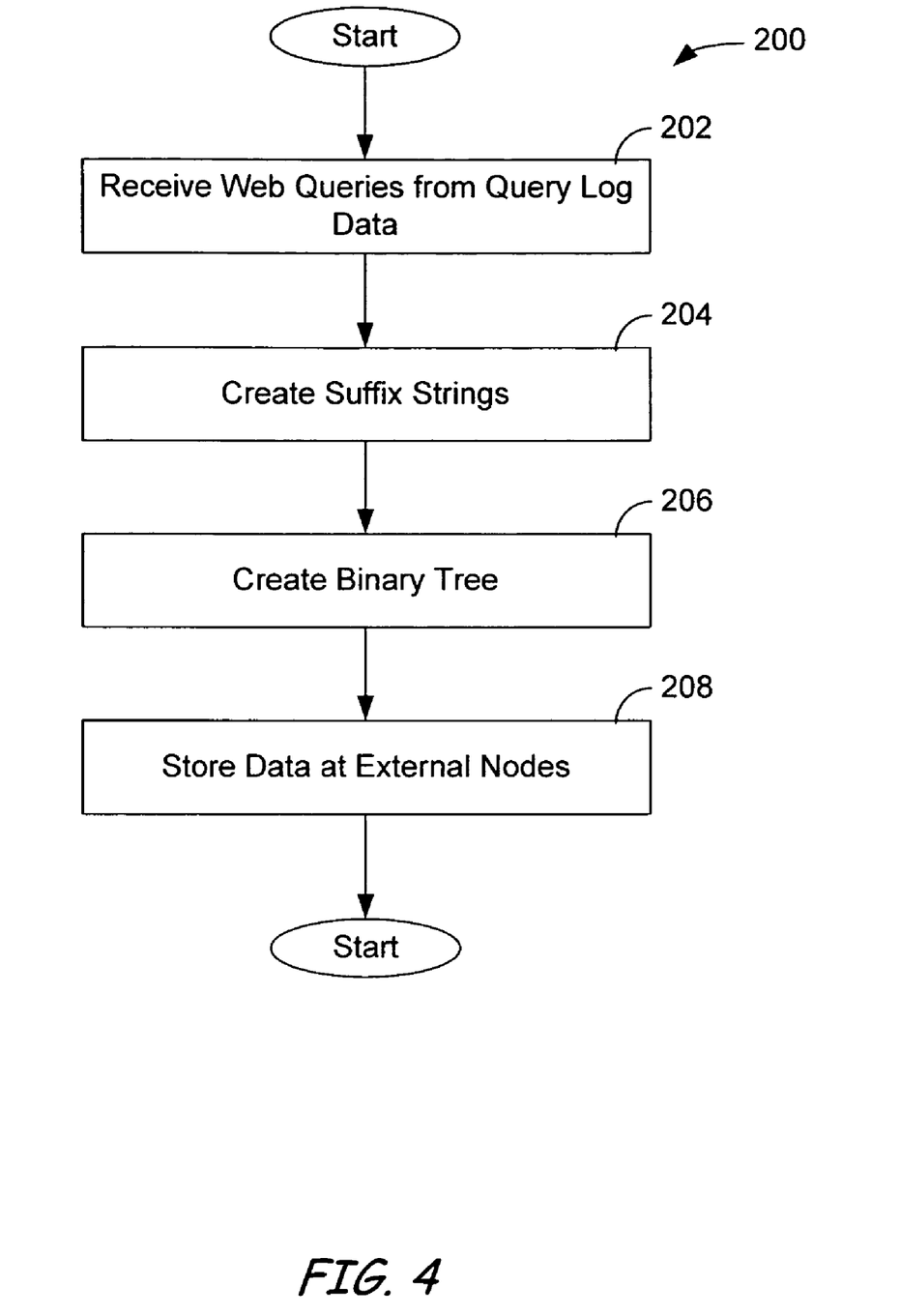
FIG. 4 is a flow diagram illustrating a method of creating a data structure that stores web searches accessible by a search engine according to one embodiment of the invention.

FIG. 4 illustrates a method 200 of creating the symbol data structure 106 (in FIG. 2) according to one illustrative embodiment. In one embodiment, the symbol data structure 106 is a binary PAT tree, although other types of search trees and data structures can be used without departing from the scope of the discussion. First, as discussed above, the data structure generator 108 receives web queries from the query logs 110. FIG. 3 illustrates examples of web queries. This is represented by block 202. Once the web queries are obtained, the data structure generator 108 creates suffix strings of all the possible characters of the queries. For example, from the web query 中国银行 the data structure generator 108 creates four suffix strings: 中国银行 国银行, 银行, and 行. This is represented by block 204.

Figure 5:
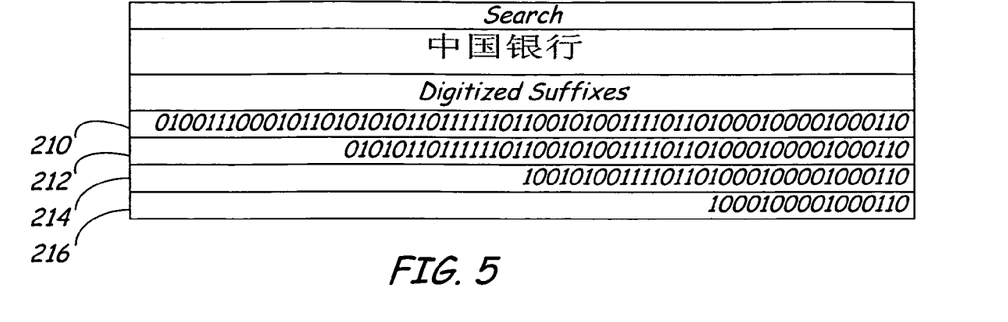
FIG. 5 is a table illustrating a number of searches and related alphanumeric strings according to one embodiment of the invention.

Once the suffix strings are created, they are joined together into a binary tree as is shown in block 206. This includes converting the suffix strings into binary representations. In one embodiment, each Chinese character is represented by a 16-bit binary number, although other values may be applied to each Chinese character. FIG. 5 illustrates the suffix strings of the web query, 中国银行 and their respective binary representations.

Figure 6:
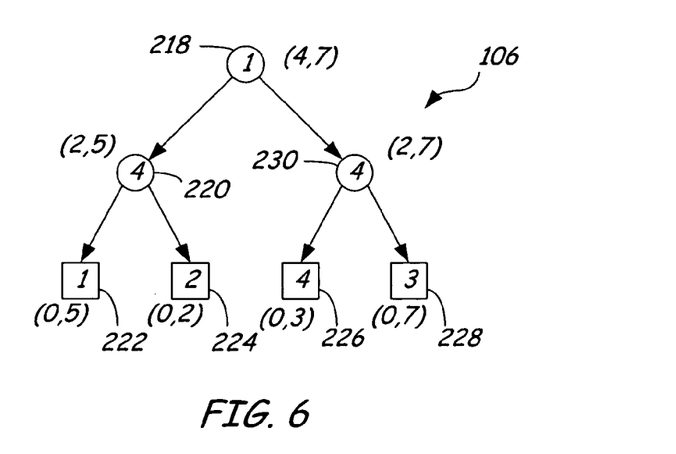
FIG. 6 is representation of a portion of a data structure corresponding to table of FIG. 5.

FIG. 6 illustrates a symbol data structure 106 assuming that the entire tree consists of the suffixes of the web search 中国银行. In practice, the symbol data structure 106 can be very large, including the suffixes of hundreds or even thousands or more predefined or previously used web queries. Symbol data structure 106n external nodes, represented by squares and n−1 internal nodes, represented by circles, where n is the number of unique suffix strings. In this example, n=4, which is the number of unique suffix strings in this particular example. The symbol data structure 106 is thus created so that when an input string is provided, the traversal of the tree is successfully and efficiently provided. Once, the symbol data structure 106 is created, data is stored at each of the nodes. This is represented by block 208 and discussed in more detail below.

The four binary representations of the suffixes 210-216 can be differentiated from each other by traversing the first for bits of the suffixes. That is, suffix 210 begins with a "0100" pattern, the suffix 212 begins with a "0101" pattern, the suffix 214 begins with a "1001" pattern and the suffix 216 begins with a "1000" pattern. This is represented in the symbol data structure 106. The symbol data structure 106 is illustratively traversed as follows. Beginning at internal node 218, a bit comparison is made of the input string provided. Internal node 218 is represented as a circle with the number "1" located inside of it. The "1" indicates that the comparison to be made at this internal node 218 is of the first bit of the input. If the first bit is a "0", the symbol data structure 106 is traversed to the left. If the first bit is a "1", the symbol data structure 106 is traversed to the right.

Assuming that the input has a first bit that is a "0", the symbol data structure 106 is traversed to internal node 220. At internal node 220, the fourth bit of the input is compared. If the fourth bit is a zero, the symbol data structure 106 is traversed to the external node 222, represented by a square. The number shown in the external node represents the first suffix 210. If the fourth bit is a one, the symbol data structure 106 is traversed to the external node 224, which represents the second suffix 212.

Reviewing the beginning patterns of the four suffixes in the data structure, it can be seen that only the first suffix 210 and the second suffix 212 have a first bit equal to "0". Further, each of the first and second suffixes 210 and 212 have second and third bit patterns of "10". Therefore, it is not necessary to compare the second and third bits. It is the fourth bit that differentiates between the first and second suffixes 210 and 212. Thus, the symbol data structure 106 is efficient in that it requires the minimum number of comparisons to reach an external node at any point in the symbol data structure 106. In one embodiment, the symbol data structure 106 can be traversed as discussed above at any point in the data structure.

Each of the external nodes, 222, 224, 226, 228 contain information including the web search itself and the popularity of the search, that is, the number of times that particular search appears in the search logs 110. The frequency of each external node is illustrated parenthetically in FIG. 6. In addition, each of the internal nodes 218, 220, and 230 illustratively store information. For example, each node is shown as storing the number of external nodes located in the tree below it. The nodes located in below a particular node in a tree are known as "children". The internal nodes also include and a popularity or frequency index or score. Both numbers are shown in parentheses. The popularity index at an internal node equals the highest popularity at any of its child nodes. The symbol data structure 106 is constructed such that each substructure or subtree has all of the substrings of a given prefix. Therefore, traversing the symbol data structure 106 with a prefix will assuredly find all searches that begin with that exact prefix. Traversal of the symbol data structure 106 to retrieve web search data is discussed in more detail below.

Figure 7:
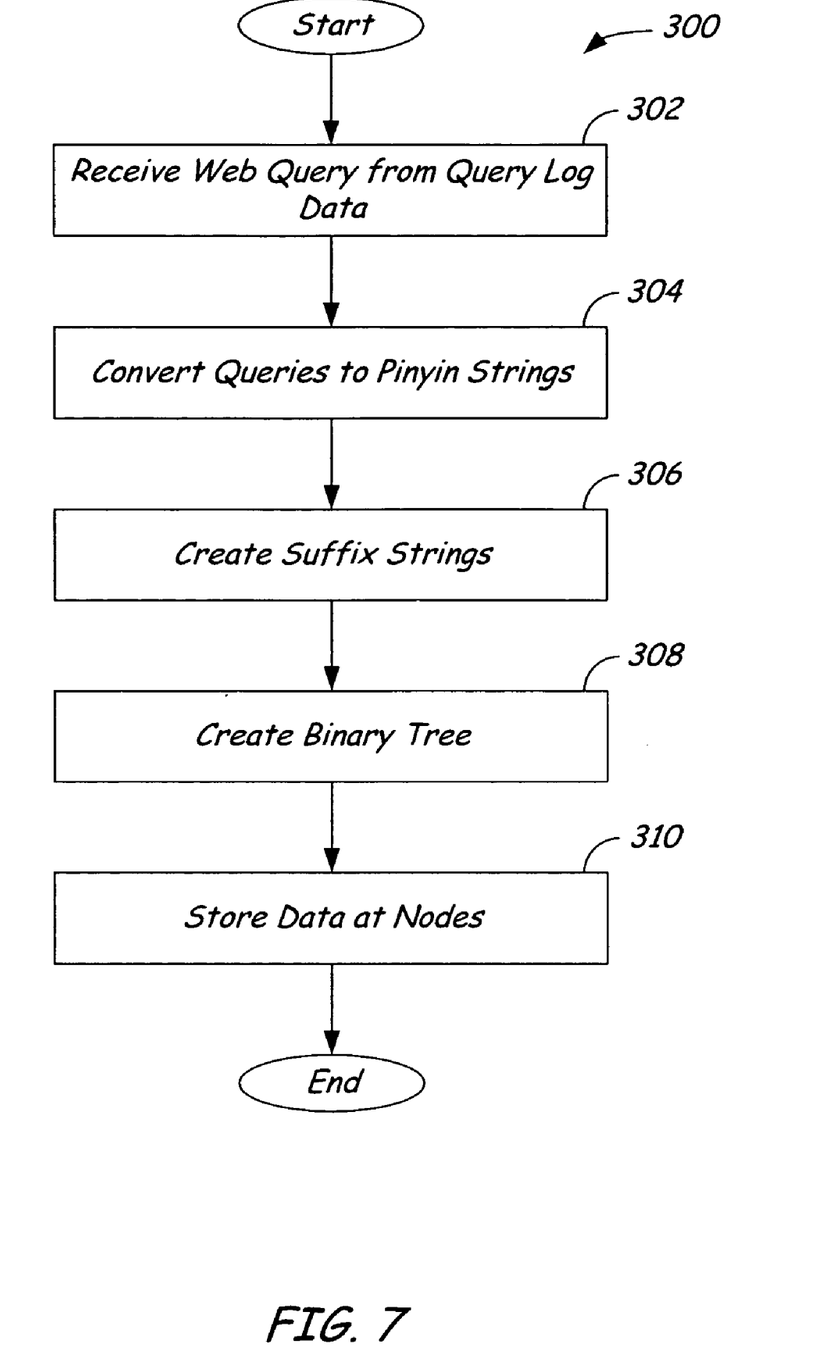
FIG. 7 is a flow diagram illustrating a method of creating a data structure for storing information about web searches accessible by a search engine according to one embodiment of the invention.

FIG. 7 illustrates a method 300 of building pinyin data structure 104 (shown in FIG. 2) according to one illustrative embodiment. In one embodiment, the pinyin data structure 104 is a binary PAT tree, although other types of search trees and data structures can be used without departing from the scope of the discussion. First, as discussed above, the data structure generator 108 receives web queries from the query logs 110. FIG. 3 illustrates examples of web queries. This is represented by block 302.

Figure 8:
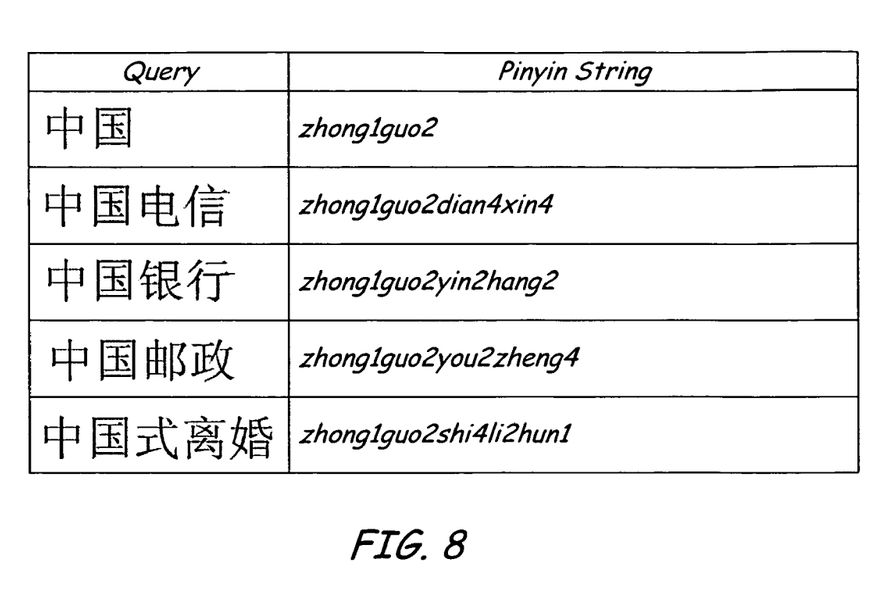
FIG. 8 is a table illustrating a number of searches and related alphanumeric strings for insertion into a data structure of the type illustrated in FIG. 6 according to one embodiment of the invention.

Once the web queries are received, the data structure generator 108 converts the web queries to pinyin or alphanumeric strings. This is represented in block 304. In addition, FIG. 8 illustrates a table of web queries and their representative pinyin strings. For example, the web query, 中国银行 has a pinyin string of "zhong1guo2yin2hang2". The data structure generator 108 then creates suffix strings out of the pinyin strings similar to those described above relative to the symbol data structure 106. This is represented by block 306.

The data structure generator 108 then creates a pinyin data structure 104 that is illustratively a binary tree of the type described above with respect to the symbol data structure 106. This is represented by block 308. The nodes of the pinyin data structure 104 are provided with information related to the symbol data structure 106. This is provided by block 310. For example, the external node created by the pinyin "zhong1guo2yin2hang2" will contain the information related to the web query 中国银行 indicating that an input having this particular pinyin string should have, as a possible web query, the string 中国银行

The method described above creates the pinyin data structure 104 and stores data in the nodes of the pinyin data structure 104 so that it can be traversed successfully when it receives an input that is exactly the same as the pinyin string or a first portion of the pinyin string that corresponds to the web query. Alternately, the pinyin data structure 104 can be created to include additional paths and nodes so that it can be traversed to find a particular web query without typing in exactly the pinyin string or a portion of the beginning of it.

Figure 9:
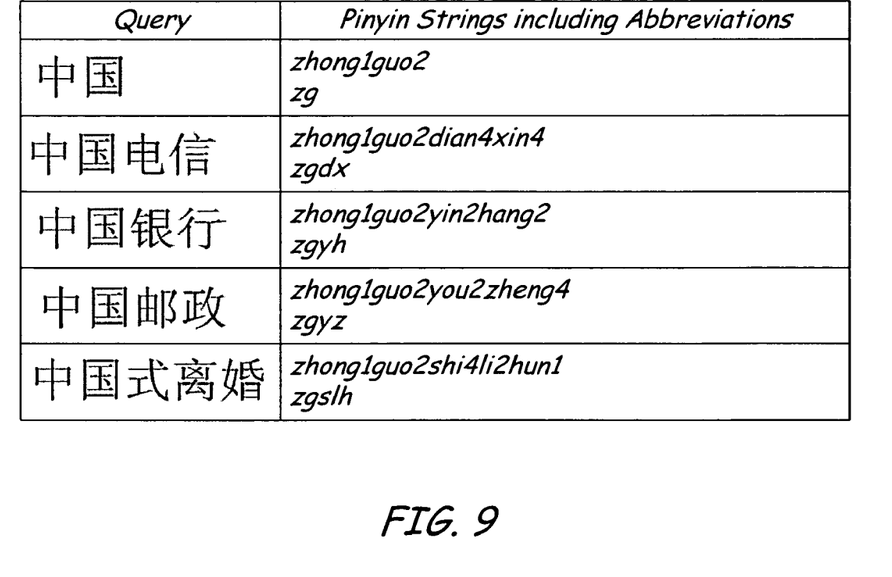
FIG. 9 is a table illustrating a number of searches and related alphanumeric strings for insertion into a data structure of the type illustrated in FIG. 6 according to another embodiment of the invention.

FIG. 9 shows an alternative embodiment for creating the pinyin data structure 104 that includes abbreviations for a pinyin string. For each web query received from the query logs 110 (step 302 in FIG. 7), two pinyin strings are created. The first pinyin string is a complete spelling of each pinyin associated with the web query. The second pinyin string is an acronym of the complete pinyin string. For example, the web query 中国银行 received from the query logs is converted to a pinyin string of "zhong1guo2yin2hang2" and a pinyin string of "zgyh". Thus, the pinyin data structure 104 is constructed to have two separate external nodes that point to the 中国银行 web query in the symbol data structure 106. As it is possible that more than one pinyin string can have the abbreviation "zgyh", the external node associated with "zgyh" in the pinyin data structure 104 can have information for more than one web query.

Figure 10:
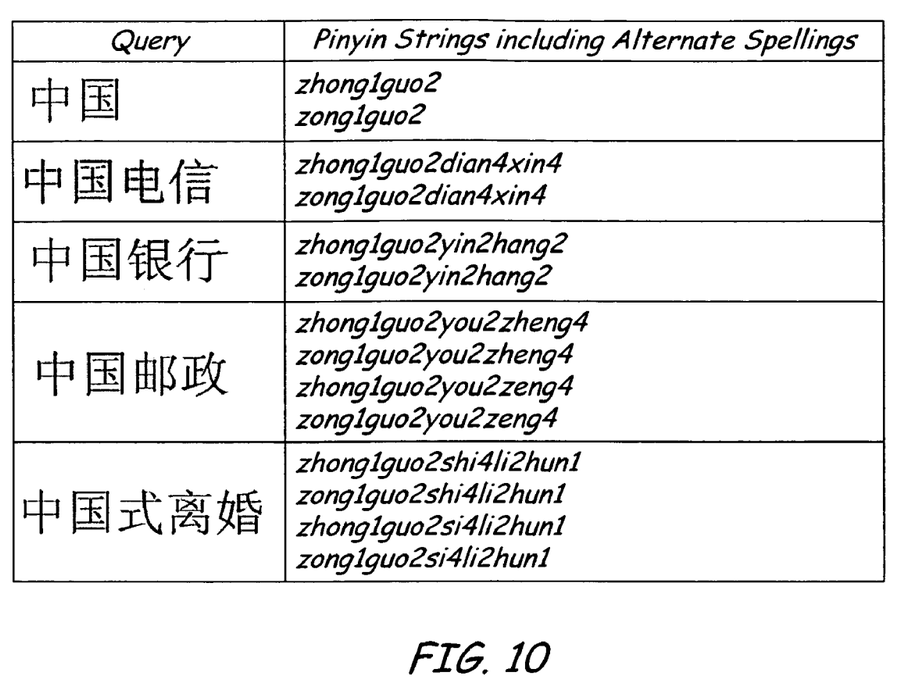
FIG. 10 is a table illustrating a number of searches and related alphanumeric strings for insertion into a data structure of the type illustrated in FIG. 6 according to still another embodiment of the invention.

FIG. 10 illustrates yet another embodiment for creating the pinyin data structure 104 that illustratively includes provisions to account for common misspellings. At step 302 in FIG. 7, a web query is received from the query logs 110. The web query is then converted to a pinyin string, as described above. In addition, the pinyin string is checked for common misspelling patterns. For example, one common misspelling pattern might be confusing the letter "z" for "zh" and vice versa. Another similar common misspelling pattern might be confusing "s" for "sh" and vice versa.

Thus, in one illustrative embodiment, the step 304 of converting queries to pinyin strings further includes checking for a common misspelling pattern and creating two separate pinyin strings, with one string having the first alternative and one string having the second alternative. For the web query 中国, two pinyin strings would be created: one reading "zhong1guo2" and another reading "zong1guo2". Each of the pinyin strings would be incorporated into the pinyin data structure 104 with data relating to the web query 中国 in the symbol data structure 106. In addition, the external nodes corresponding to each of the "zhong1guo2" and "zong1guo2" pinyin strings would also have data relating to the web query "总国" in the symbol data structure 106 as "总国" is the web query whose pinyin string is correctly spelled "zong1guo2".

In the event that there are multiple occurrences of commonly misspelled patterns, the process creating pinyin strings in the illustrative embodiment includes creating $2^n$ pinyin strings, where n=the number of occurrences of commonly misspelled patterns. As an example, the web query 中国邮政 has a pinyin string that is properly spelled as "zhong1guo2you2zheng4". Because it has two occurrences of the pattern "zh", either or both of which could be misspelled, four pinyin strings are illustratively created. Along with the proper spelling, the data structure generator 108 creates the following pinyin strings: "zong1guo2you2zheng4", "zhong1guo2you2zeng4", and "zong1guo2you2zeng4". It should be appreciated that any potential pattern of misspelling can be included into the pinyin search tree 104 without departing from the spirit and scope of the discussion. In addition, the features described here of utilizing abbreviation as well as the handling of potential misspellings can be combined as well.

In operation, the web query suggestion system 10 receives an input from user 16, as discussed above and as represented by block 332 in FIG. 11. The input is then converted to a digital input string, as illustrated by block 334. The search engine 100 then traverses the pinyin data structure 104, comparing the digital input string against the pinyin data structure 104 until either the digital input string is completely exhausted or until an external node is reached. This is represented by block 336.

Figure 12:
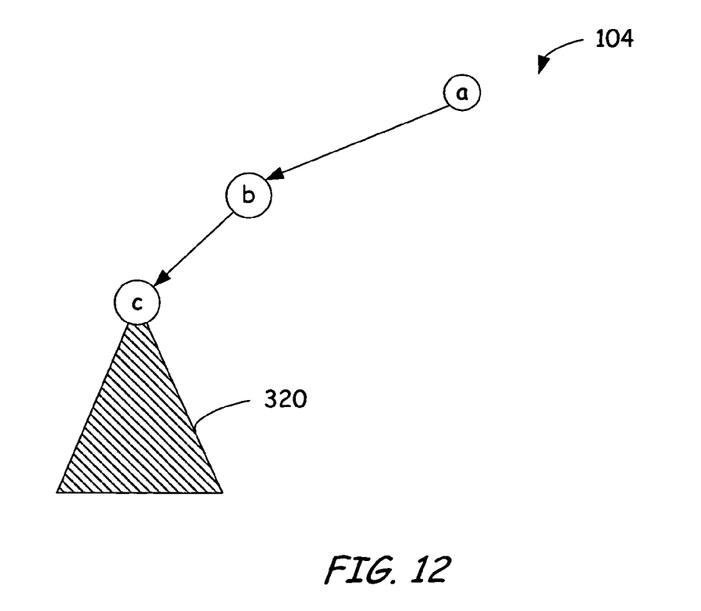
FIG. 12 is an illustration of portion of a representative data structure of alphanumeric characters, showing a search path through the data structure.

If an external node of the pinyin data structure 104 is reached, the search engine 100 receives data related to the symbol data structure 106 from the external node that has been reached. If the search engine has exhausted the input string before reaching an external node, the search engine 100 receives data related to the symbol data structure 106 from the internal node at which the search was exhausted and from every child of that node. An illustrative example is provided in FIG. 12. A pinyin string of "abc" is searched in the pinyin data structure 104. When the pinyin string is exhausted, the subtree or substructure headed by "c" provides the entire results of the search. The subtree or substructure is represented by shaded portion 320. All data related to the symbol data structure 106 within the shaded portion 320 is retrieved.

Figure 13:
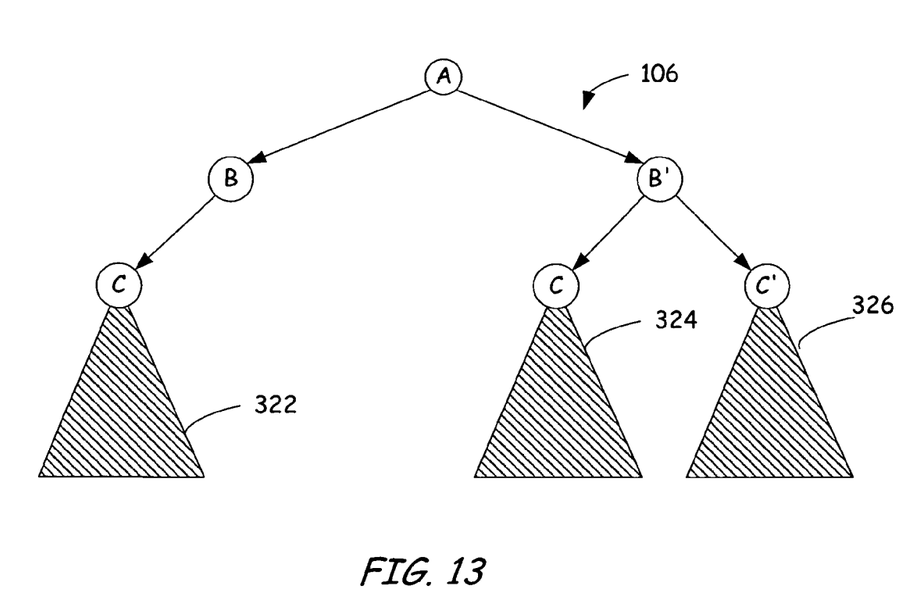
FIG. 13 is an illustration of portion of a representative data structure of web searches related to the data structure of FIG. 11 and showing a search path through the data structure.

The search engine 100 then uses the data retrieved from the pinyin data structure 104 to search the symbol data structure 106. This is illustrated in block 338. Depending upon the data retrieved from the pinyin data structure 104, the search engine 100 may search and retrieve information from multiple branches of the symbol data structure 106. An illustrative example is provided in FIG. 13. The symbol data structure 106 illustrates a search corresponding to ABC, AB'C and AB'C' portions of the symbol data structure 106. In one embodiment, all of the web queries found in the ABC, AB'C and AB'C' portions, identified as shaded portions 322, 324, and 326 of the symbol data structure 106 are collected by the search engine 100. This is represented by block 340.

Figure 11:
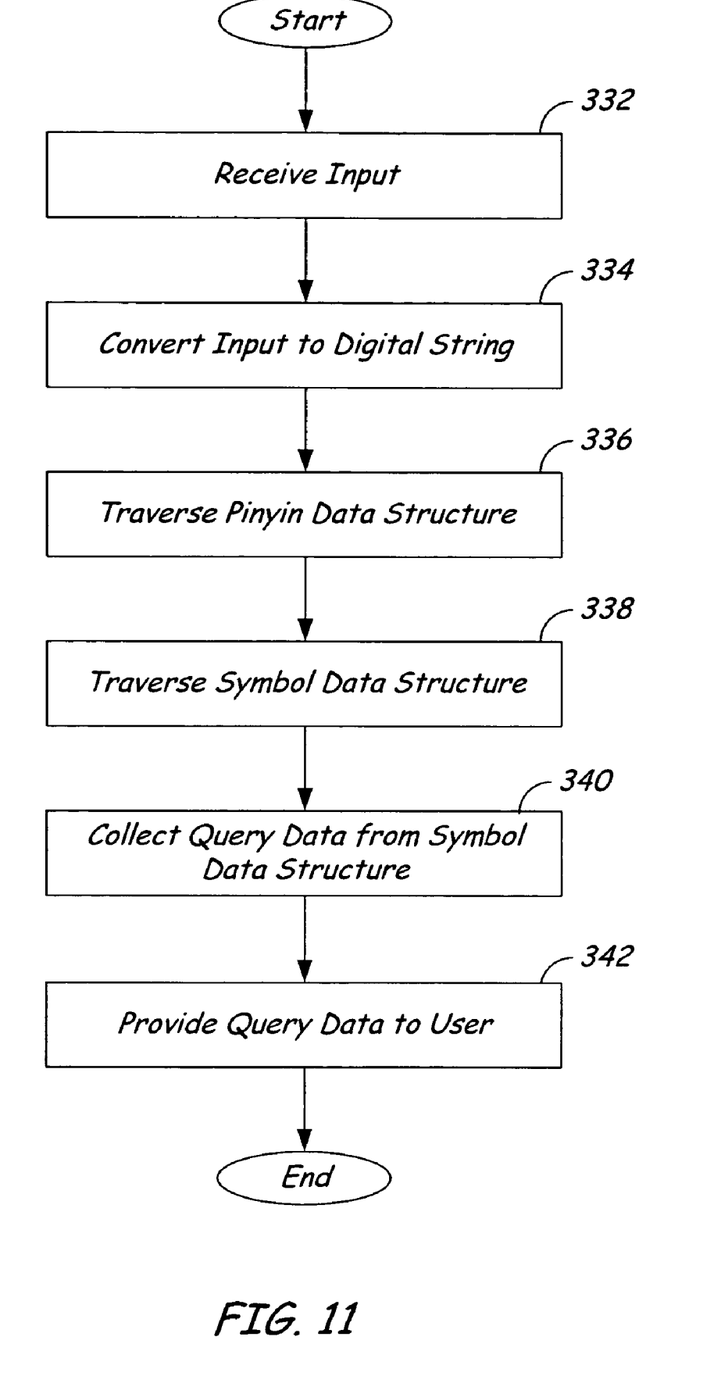
FIG. 11 is a flowchart illustrating a method of searching the web search generator of FIG. 1 to access a list of web searches according to one illustrative embodiment.

Some or all of the web queries collected by the search engine 100 are provided to the input/output device 14, as is shown in block 342. In one embodiment, all of the web queries are provided to the input/output device 14. The web queries are illustratively ordered by frequency of use. Alternatively, the total number web queries that are returned to the input/output device 14 might be limited. For example, a maximum of 10, 20, 50 or any other number of web queries may be returned. The user 16 can then chose any one of the queries for submission to the web search engine 18.

The embodiments described above discuss a finite state model based approach to web query suggestions. The embodiments provide important advantages. By creating a finite state model, user input using alphanumeric characters for a web query in a symbolic language such as Chinese can return a list of popular web queries that can be selected from by the user. In addition, it is not necessary for the user to enter the entire alphanumeric string related to a particular web query in order to receive that query in response, thereby reducing the time spent keying in an input. Further, the finite state model can advantageously allow for shortcuts such as entering abbreviations that correspond to a web query. Further still, the finite state model can advantageously account for common spelling mistakes.

Figure 14:
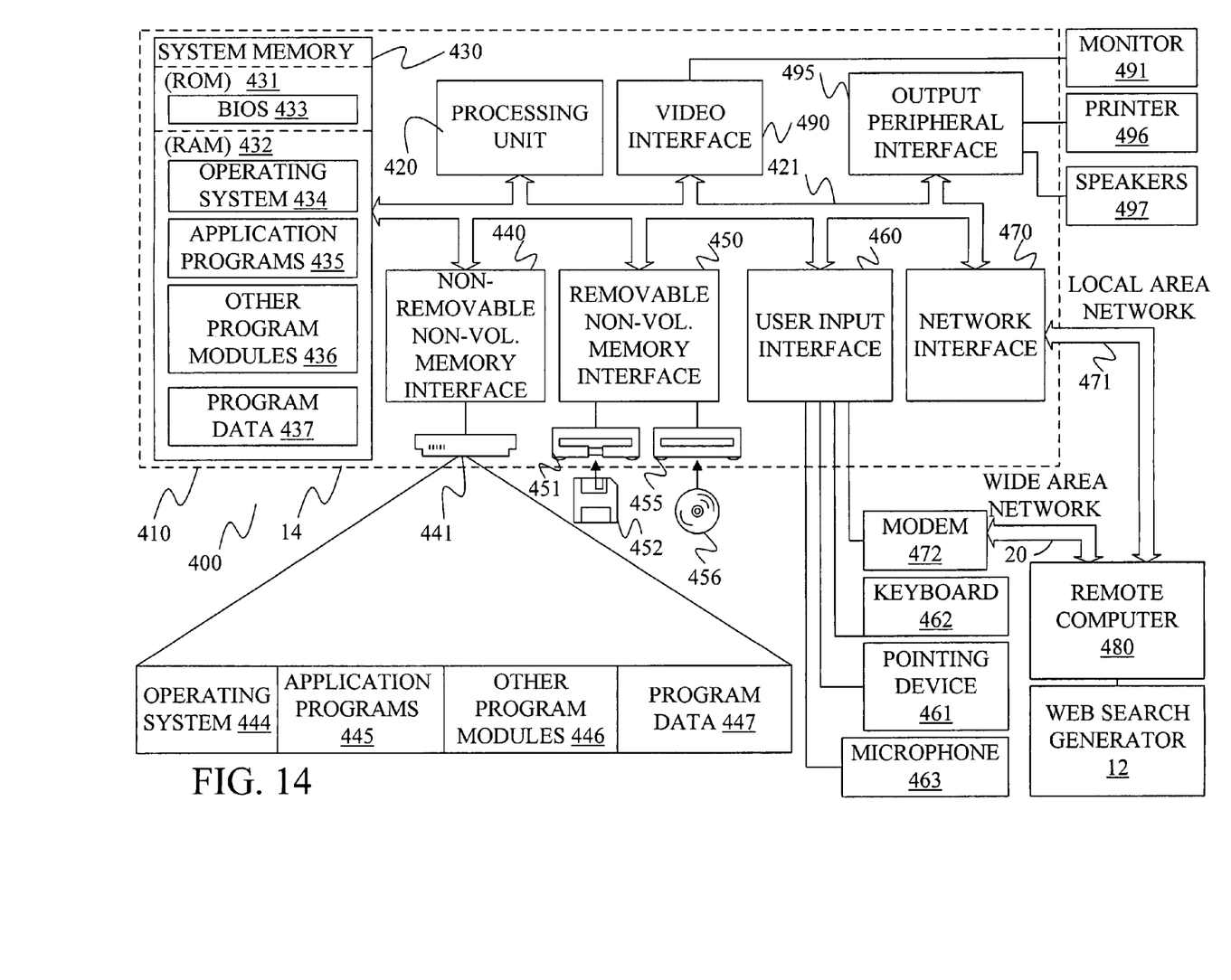
FIG. 14 is a block diagram of one computing environment in which some of the discussed embodiments may be practiced.

FIG. 14 illustrates an example of a suitable computing system environment 400 on which embodiments of the finite state model based approach to web query suggestions discussed above may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

The finite state model embodiments are operational with numerous other general purpose or special purpose computing system environments or configurations. Examples of well-known computing systems, environments, and/or configurations that may be suitable for use with various finite state model embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The finite state model embodiments may be described in the general context of computer-executable instructions, such as program modules, being executed by a computer. Generally, program modules include routines, programs, objects, components, data structures, etc. that perform particular tasks or implement particular abstract data types. Some finite state model embodiments are designed to be practiced in distributed computing environments where tasks are performed by remote processing devices that are linked through a communications network. In a distributed computing environment, program modules are located in both local and remote computer storage media including memory storage devices.

With reference to FIG. 14, an exemplary system for implementing some embodiments includes a general-purpose computing device in the form of a computer 410. As an example, input/output device 14 can be implemented as a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Any of the media can be used to store any program modules associated with the finite models described above, including, but not limited to, the search engine 100 and the data structure generator 108 or data structures such as the pinyin data structure 104, the symbol data structure 106 and the query logs 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 14 illustrates operating system 434, application programs 435, other program modules 436, and program data 437.

The computer 410 may also include other removable/non-removable volatile/nonvolatile computer storage media. By way of example only, FIG. 14 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 14, provide storage of computer readable instructions, data structures, program modules and other data for the computer 410. In FIG. 14, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the input/output device 14, which may be implemented as a computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB).

A monitor 491 or other type of display device is also connected to the system bus 421 via an interface, such as a video interface 490. The monitor 491 may be used to display information to the user regarding potential web queries. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 14 include a local area network (LAN) 471 and a wide area network (WAN) 20, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 20, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 14 illustrates that the web search generator 12 resides on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of creating an index of web queries, comprising:
   receiving a first query representative of one or more non-alphanumeric symbolic characters;
   receiving a second query representative of another one or more non-alphanumeric symbolic characters, the first and the second queries sharing at least one common non-alphanumeric symbolic character;
   creating suffix strings corresponding to the first and the second queries;
   converting the suffix strings into binary representations;
   utilizing the binary representations of the suffix strings to form a first binary tree, nodes of the first binary tree having a plurality of queries incorporated therein and at least one of the nodes including an indication of a digit to compare to differentiate the binary representations corresponding to the first and the second queries;
   creating a first text string of alphanumeric characters representative of the one or more non-alphanumeric symbolic characters of the first query;
   creating a second text string of alphanumeric characters representative of the another one or more non-alphanumeric symbolic characters of the second query;
   incorporating, with the use of a processor, the first and the second text strings into a second binary tree capable of having a plurality of text strings incorporated therein, the second binary tree having at least one node that corresponds to one of the plurality of queries incorporated within the first binary tree.

2. The method of claim 1, wherein utilizing the binary representations of the suffix strings to form the first binary tree comprises:
creating multiple levels of internal nodes;
creating a level of external nodes; and
grouping the external nodes into pairs with each pair being associated with one of the internal nodes.

3. The method of claim 1, and further comprising:
creating additional text strings representative of the one or more non-alphanumeric symbolic characters of the first query;
incorporating the additional text strings into the second binary tree; and
associating the additional text strings with the first query.

4. The method of claim 3, wherein the step of creating the additional text strings includes creating a text string that is an abbreviation of the first text string.

5. The method of claim 3, wherein the step of creating the additional text strings includes creating a text string that is a deliberate misspelling of the first text string.

6. The method of claim 1, wherein the step of receiving a first query representative of one or more non-alphanumeric symbolic characters includes receiving a first query representative of one or more Chinese language characters.

7. The method of claim 1, wherein creating the suffix strings comprises including data representative of a portion of an end of the first query and a portion of an end of the second query.

8. A computer-implemented method of creating an index of web queries, comprising:
receiving a first query representative of a plurality of non-alphanumeric symbolic characters;
creating a first suffix string corresponding to a last one of the plurality of non-alphanumeric symbolic characters;
creating a second suffix string corresponding to the last one of the plurality of non-alphanumeric symbolic characters and at least an additional one of the plurality of non-alphanumeric symbolic characters,
creating a third suffix string corresponding to all of the plurality of non-alphanumeric symbolic characters;
incorporating the first query into a first binary tree capable of having a plurality of queries incorporated therein, the first binary tree having external nodes that correspond to the first, the second, and the third suffix strings;
creating a first text string of alphanumeric characters representative of the plurality of non-alphanumeric symbolic characters of the first query;
incorporating, with the use of a processor, the first text string into a second binary tree capable of having a plurality of text strings incorporated therein; and
associating the first text string with the first, the second, and the third suffix strings.

9. The method of claim 8 wherein the first, the second, and the third suffix strings have a common non-alphanumeric symbolic character.

10. A computer-implemented method of creating an index of web queries, comprising:
receiving a query representative of one or more non-alphanumeric symbolic characters;
generating suffix strings that correspond to the query;
incorporating the query suffix strings into a first binary tree;
creating a first text string of alphanumeric characters representative of the one or more non-alphanumeric symbolic characters of the query;
creating a second text string of alphanumeric characters representative of the one or more non-alphanumeric symbolic characters of the query, the second text string being different than the first text string
generating suffix strings that correspond to the first and the second text strings;
incorporating, with the use of a processor, the suffix strings of the first and the second text strings into a second binary tree; and
associating the query suffix strings in the first binary tree with the suffix strings of the first and the second text strings in the second binary tree.

11. The method of claim 10, wherein the first text string and the second text string are alternative spellings of a same word, and wherein the first binary tree includes a plurality of nodes and each node has an indication of a frequency associated with one of the query suffix strings.

12. The method of claim 10, wherein the first text string is an abbreviation of the second text string, and wherein each of the first and the second binary trees includes a plurality of internal and external nodes.

* * * * *

UNITED STATES PATENT AND TRADEMARK OFFICE
CERTIFICATE OF CORRECTION

| | | |
|---|---|---|
| PATENT NO. | : 8,024,319 B2 | Page 1 of 1 |
| APPLICATION NO. | : 11/698011 | |
| DATED | : September 20, 2011 | |
| INVENTOR(S) | : Jianfeng Gao et al. | |

It is certified that error appears in the above-identified patent and that said Letters Patent is hereby corrected as shown below:

In column 11, line 41, in Claim 8, delete "characters," and insert -- characters; --, therefor.

Signed and Sealed this
Twenty-ninth Day of November, 2011

David J. Kappos
*Director of the United States Patent and Trademark Office*